(12) United States Patent
Wong et al.

(10) Patent No.: US 7,072,917 B2
(45) Date of Patent: Jul. 4, 2006

(54) EXTENDED STORAGE CAPACITY FOR A NETWORK FILE SERVER

(75) Inventors: Thomas K. Wong, Pleasanton, CA (US); Panagiotis Tsirigotis, Sunnyvale, CA (US); Anand Iyengar, Mountain View, CA (US); Rajeev Chawla, Union City, CA (US)

(73) Assignee: NeoPath Networks, Inc., Santa Clara, CA (US)

( * ) Notice: Subject to any disclaimer, the term of this patent is extended or adjusted under 35 U.S.C. 154(b) by 0 days.

(21) Appl. No.: 10/832,927

(22) Filed: Apr. 26, 2004

(65) Prior Publication Data

US 2004/0267832 A1    Dec. 30, 2004

Related U.S. Application Data

(60) Provisional application No. 60/465,580, filed on Apr. 24, 2003, provisional application No. 60/465,579, filed on Apr. 24, 2003, provisional application No. 60/465,578, filed on Apr. 24, 2003.

(51) Int. Cl.
G06F 12/00 (2006.01)
G06F 17/00 (2006.01)

(52) U.S. Cl. .................. 707/205; 707/204; 707/101

(58) Field of Classification Search ........... 707/200, 707/205, 1, 100, 204, 101; 709/200, 217, 709/201, 218
See application file for complete search history.

(56) References Cited

U.S. PATENT DOCUMENTS

| | | | |
|---|---|---|---|
| 5,689,701 A | 11/1997 | Ault et al. | 707/10 |
| 5,774,715 A * | 6/1998 | Madany et al. | 707/101 |
| 6,353,837 B1 * | 3/2002 | Blumenau | 707/205 |
| 6,389,427 B1 | 5/2002 | Faulkner | 707/104.1 |
| 6,442,548 B1 | 8/2002 | Balabine et al. | 707/10 |
| 6,606,690 B1 | 8/2003 | Padovano | 711/148 |
| 6,697,846 B1 | 2/2004 | Soltis | 709/217 |
| 2003/0154236 A1 | 8/2003 | Dar et al. | 709/201 |
| 2003/0195903 A1 | 10/2003 | Manley et al. | 707/201 |
| 2003/0204670 A1 * | 10/2003 | Holt et al. | 711/112 |

(Continued)

OTHER PUBLICATIONS

Interposed Request Routing for Scalable Network Storage, Anderson et al., ACM Transactions on Computer Systems, vol. 20, No. 1, Feb. 2002.*

(Continued)

*Primary Examiner*—Greta Robinson
*Assistant Examiner*—Kuen S. Lu (57) ABSTRACT

A NAS switch provides extended storage capacity to a file server in a decentralized storage network such as a NAS (Network Attached Storage) storage network. The NAS switch sits in the data path of a client on the front end and a directory file server and shadow file servers on the back end. A segregation module in the NAS switch replicates data from the directory file server to a shadow file server, and then replaces the data in the directory file server with holey files. Holey files, which store a range of consecutive values such as zero with negligible storage space, retain the attributes of the data without retaining its storage consumption. Thus, the directory file server can server as a single directory hierarchy for several shadow file servers containing data beyond a capacity of the directory file server. When the NAS switch receives operations from the client, an association module forwards directory operations to the directory file server and data operations to the shadow file server. The NAS switch also provides services to several shadow file servers from a single directory file server.

44 Claims, 6 Drawing Sheets

U.S. PATENT DOCUMENTS

2004/0024963 A1* 2/2004 Talagala et al. ............ 711/114
2004/0054748 A1 3/2004 Ackaouy et al. ............ 709/214
2004/0117438 A1 6/2004 Considine et al. .......... 709/203

OTHER PUBLICATIONS

Retry of extending networking design notes, Johnathan Goldick, PSC, Carnegie-Mellon University, Feb. 1995.*

A Scalable Architecture for Clustered Network Attached Storage, IEEE/NASA MSST2003, Apr. 7-10, San Diego, California, U.S.A.*

Leveraging th Benefits of the EMC CLARiiON IP4700 NFS with the Oracle8i Database, an Engineering White Paper, Mar. 5, 2002, EMC Corporation.*

Anderson, D.C. et al., "Interposed Request Routing For Scalable Network Storage," ACM Transactions on Computer Systems, Feb. 2002, vol. 20, No. 1, pp. 1-24.

Bright, J.D. et al., "A Scalable Architecture For Clustered Network Attached Storage," Twentieth IEEE/Eleventh NASA Goddard Conference On Mass Storage Systems & Technologies, Apr. 7-10, 2003, 12 pages, Paradise Point Resort, San Diego, CA, USA.

Goldick, J., "Retry Of Extending Networking Design Notes," PSC, Carnegie-Mellon University, Feb. 1995, 42 pages.

"Leveraging The Benefits Of The EMC CLARiiON IP4700 Network File Server With The Oracle8i Database," an Engineering White Paper, Mar. 5, 2002, EMC Corporation.

"Notification Of Transmittal Of The International Search Report And The Written Opinion Of The International Searching Authority, Or The Declaration," for PCT/US04/12844, Mar. 14, 2005, 14 pages.

* cited by examiner

EXTENDED STORAGE CAPACITY FOR A NETWORK FILE SERVER

CROSS-REFERENCE TO RELATED APPLICATIONS

This application claims priority under 35 U.S.C. § 119(e) to: U.S. Provisional Patent Application No. 60/465,580, filed on Apr. 24, 2003, entitled "Method and Apparatus to Extend the Storage Capacity to a Network File Server," by Thomas K. Wong et al.; U.S. Provisional Patent Application No. 60/465,579, filed on Apr. 24, 2003, entitled "Method and Apparatus for Transparent File Migration Using the Technique of Namespace Replication," by Thomas K. Wong et al.; U.S. Provisional Patent Application No. 60/465,578, filed on Apr. 24, 2003, entitled "Method and Apparatus for Transparent File Replication Using the Technique of Namespace Replication," by Thomas K. Wong et al.; and is related to U.S. patent application Ser. No. 10/831,376, filed on Apr. 23, 2004, entitled "Transparent File Migration Using Namespace Replication," by Thomas K. Wong et al.; and U.S. patent application Ser. No. 10/831,701, filed on Apr. 23, 2004, entitled "Transparent File Replication Using Namespace Replication," by Thomas K. Wong et al., each of which applications are herein incorporated by reference in their entirety.

BACKGROUND OF THE INVENTION

1. Field of the Invention

This invention relates generally to storage networks and, more specifically, to a network device on a storage network that segregates files into separately stored directory metadata and associated data such that a file server containing the directory metadata can appear to store data beyond its storage capacity.

2. Description of the Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access the same files on a NAS file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. By heterogeneous client operating systems may require additional copies of each file to be stored on the storage network to ensure compatibility on the SAN file server. Additionally, communication between clients and file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

A related drawback of decentralized control is that services must be separately purchased and installed to each NFS file server. Likewise, updates and maintenance of the services are separately provided. Furthermore, each installed service consumes data capacity that could be better used to server the main purpose of a storage network, which is to store data.

Therefore, what is needed is a robust network device to provide transparency for clients of decentralized file servers such as NAS file servers. Furthermore, the network device should provide a centralized directory service using a network file server that is uninhibited from data storage responsibilities and thus can store a directory hierarchy referring to an amount of data beyond a storage capacity of the network file server. Moreover, the directory service should enable additional centralized services that rely on directory information.

BRIEF SUMMARY OF THE INVENTION

The present invention meets these needs by providing extended storage capacity to a file server. A NAS (Network Attached Storage) switch in the data path of a client and NAS file servers on the storage network, stores directory metadata separately from associated data to extend the storage capacity of a directory file server. Advantageously, the directory file server provides a single directory hierarchy for the client to access data, on the order of 10 or 20 times the directory file server storage capacity, across a decentralized storage network.

An embodiment of a system configured according to the present invention comprises the NAS switch in communication with the client on a front-end of the storage network, and both a directory file server and one or more shadow files server on a back-end. The NAS switch associates NAS file handles (e.g., CIFS file handles or NFS file handles), indicative of an object location on the storage network, with switch file handles that are independent of the object location. The NAS switch then exports the switch file handles to the client. In response to subsequent object access requests from the client, the NAS switch substitutes switch file handles with appropriate NAS file handles for submission to the appropriate NAS file server.

In another embodiment, the NAS switch comprises a segregation module to coordinate separate storage of objects into directory metadata on the directory file server and associated data on the shadow file server. The segregation module can store holey files, containing a range of consecutive values such as zero with negligible storage space, in the directory file server so that the holey file appears to have the same file attributes as the object without retaining its storage consumption. The segregation module stores data on a shadow file server and a correlating entry into, for example, a directory server table. In one embodiment, the NAS switch performs tree hollowing to convert an existing NFS file server storing objects into a directory file server by replacing data in the objects with holey files.

In yet another embodiment, the NAS switch comprises an association module to process client access request to existing objects. The association module performs look-ups in the directory server table to find the shadow server associated with relevant directories on the directory file server. The association module can then resubmit directory requests to the directory file server and data requests to the appropriate shadow file server. In one embodiment, the association module performs look-ups in a local file location cache to quickly find an explicit location of the shadow file. The file location cache can store the most recently created shadow files, the most recent look-ups, the most frequently used look-ups, and the like.

In still embodiment, the directory file server provides a centralized service to decentralized file servers on the storage network. Because the directory file server provides access to an extended capacity of storage, spanning across several shadow file servers of comparable capacity, the centralized service on the directory file server can be applied against this extended capacity. For example, a file locking service that preserves data integrity during multiple accesses is able to lock files from the directory file server, thereby preventing write requests to associated data on several shadow file servers.

DETAILED DESCRIPTIONS OF THE INVENTION

The present invention provides extended storage capacity for a network file server. A NAS (Network Attached Storage) switch in the data path of a client and NAS file servers on the storage network, stores directory metadata separately from associated data to extend the storage capacity of a directory file server. Some embodiments of a system are described with respect to FIGS. 1–2, and some embodiments of a method operating therein are described with respect to FIGS. 3–6.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

Figure 1:
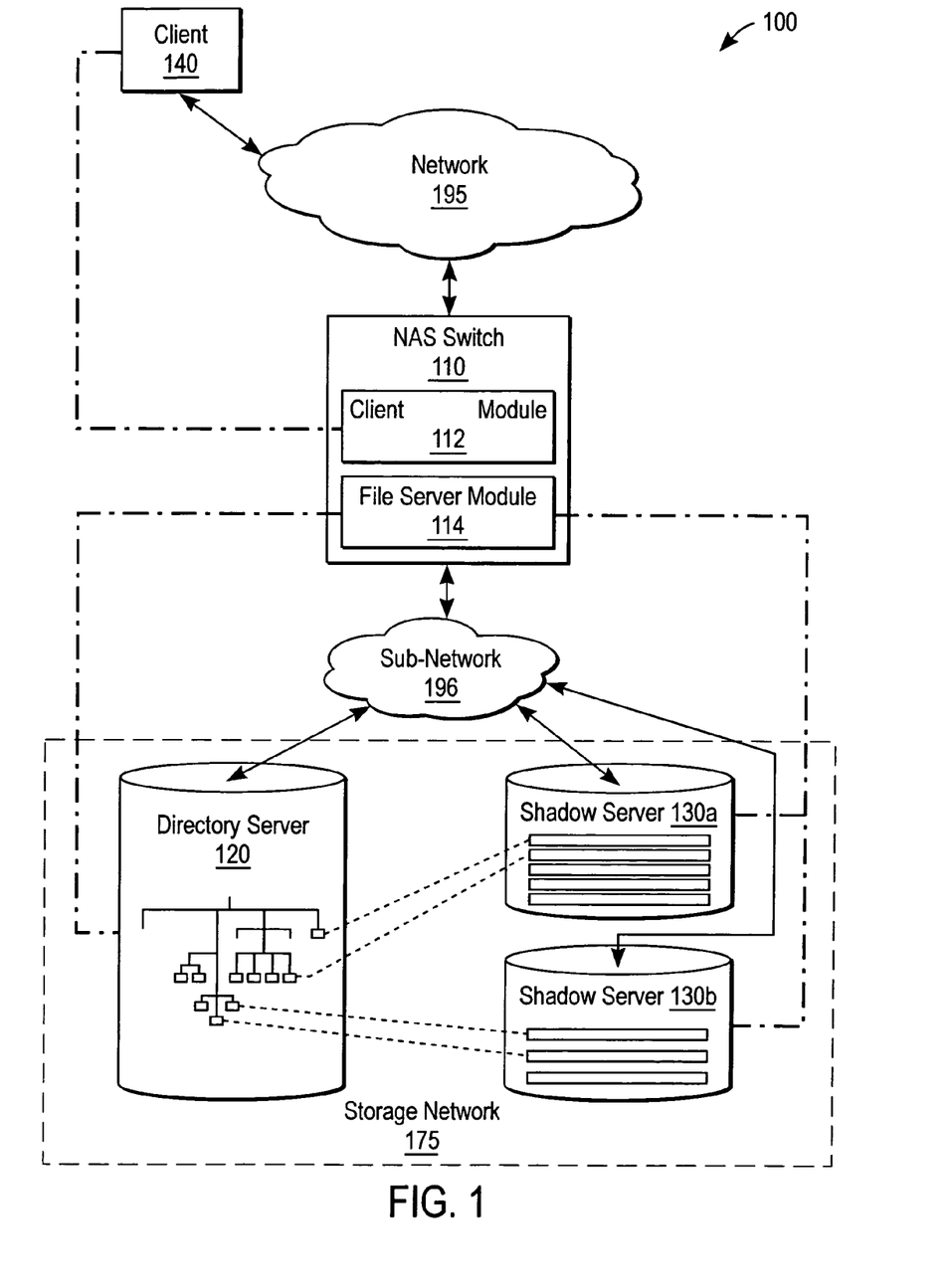
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 coupled to a client 140 and a storage network 175 through a network 195. The storage network 175 further comprises a directory file server 120, and shadow files servers 130a–b, each also coupled in communication through the network 195. Note that there can be various configurations of the system 100, such as embodiments including additional clients 140, additional directory and/or shadow file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, and the like. In one embodiment, the storage network 175 comprises a NAS storage network, using protocols such as NFS (Network File System) and CIFS (Common Internet File System). In another embodiment, the storage network 175 comprises a combination of NAS, SAN (Storage Area Network), and other types of storage networks. In yet another embodiment the storage network 175 comprises a decentralized or proprietary storage network other than NAS.

The NAS switch 110 provides continuous transparency to the client 140 with respect to object management. Specifically, the NAS switch can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the file servers 120, 130 to appropriate locations on the storage network 175. Thus, the client 140 submits object requests, such as file writes and directory reads, directly to the NAS switch 110. Likewise, the file servers 120, 130 are unaware of the NAS switch 110 since the NAS switch 110 is able to resubmit requests, associated with NAS file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a client module 112 and a file server module 114 to facilitate communications and file handle switching. The client module 112 receives exported file system directories from the file servers 120, 130 containing NAS switch handles. To create compatibility between the client 140 and the NAS switch 110, the client module 112 maps the file system directories to an internal switch file system containing switch file handles which it sends to the client 140. To request an object, the client 140 traverses an exported switch file system and selects a switch file handle which it sends to the NAS switch 110 along with a requested operation.

The file server module 114 coordinates data segregation between the directory file server 120 and the shadow file servers 130. For a new file, the file server module 114 creates a shadow file in the shadow file server 130 and a holey file in the directory file server 120. In general, a holey file is a file that contains one or more holes. A hole in a file is a range of consecutive values such as 0. Rather than storing all of the 0's, the hole is represented by just the range of zeroes, thereby using relatively little storage space. For example, if a user writes only one byte to an empty file at an offset of 1 million, the bytes between 0 to 1 million in the file are considered having the value 0 and the actual storage space occupied by the file may be as little as 512 bytes, instead of 1 million bytes. The file server module 114 also maintains associations between holey and shadow files in order to reconstruct the file upon request. In one embodiment, the NAS switch 110 and the directory file server 120 are contained within a single device.

In one embodiment, the file server module 114 also tracks reconfigurations resulting from migration, replication and other object relocation processes (e.g. adding or removing file server capacity) with a nested system of tables, or information otherwise linked to the switch file systems. The switch file handles are static as they are persistent through the relocation processes, but the associated NAS file handles can be dynamic as they are selected depending upon an object's current location. To track various copies of an object, the file server module 114 maintains a directory server table, a file location cache, file handle migration table, and/or a file handle replication table corresponding to each file system that maps NAS file handles of migrated and replicated objects to locations on the storage network 175. Further embodiments of the file server module 114 are described with respect to FIG. 2.

The client module 112 associates 310 a NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. The process of obtaining a file handle from a file name is called a look-up. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file can be a NAS file handle modified to refer to the NAS switch file system. An original NAS file handle refers to an initial object location. For segregated objects, a shadow NAS file handle refers to the location of an associated shadow file. For replicated objects, a primary NAS file handle refers to the primary or preferred object location and replica or replicated NAS file handles refer to alternative or new file locations. A stored NAS file handle refers to a NAS file handle, stored as an object on the file servers 120, 130, which points to an alternative file location.

Object access requests handled by the NAS switch 110 include, for example, directory and/or file reads, writes, creation, deletion, moving, and copying. As used herein, various terms are used synonymously to refer to a location of an object prior to replication (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by submitting a switch file handle to the NAS switch 110. To find the switch handle, the client 140 first mounts an exported switch file system containing switch file handles. The client 140 looks-up an object to obtain its file handle and submits an associated request. From the perspective of the client 140, transactions are carried out by the file servers 120, 130 having object locations that do not change. Thus, the client 140 interacts with the NAS switch 110 before and after an object segregation in the same manner. A user of the client 140 can submit operations through a command line interface, a windows environment, a software application, or otherwise. In one embodiment, the client 140 provides access to a storage network 175 other than a NAS storage network.

The directory file server 120 provides a file system capable of referencing an amount of data beyond its own storage capacity. The directory file server 120 comprises metadata representing a directory structure of objects stored on the storage network 175. Rather than storing the data referred to by metadata, the directory file server 120 can store an object as a holey file with a relatively small amount of data. As a result, the directory file server 120 is capable of efficiently providing storage network services at a single location such as concurrency control, data encryption, and the like. For example, the directory file server 120 can provide file and record locking during concurrent accesses for files stored on several shadow file servers 130, eliminating the need and expense of each shadow file server 130 providing the same service. Additionally, new software services can be installed or updated on the directory file server 120 without the need of installing or updating that same software on each shadow file server 130. In one embodiment, the system 100 comprises an back-up directory file server 120 with synchronized metadata for use during failures or overloading. The directory file server 120 comprises, for example, an NFS or other decentralized file server.

The shadow file servers 130 store shadow files corresponding to holey files stored on the directory file server 120. The shadow files comprise data such as enterprise data, records, database information, applications, and the like. In one embodiment, shadow file server 130a is dedicated to storing shadow files corresponding to one particular branch of the directory file server 120 and shadow file server 130b to a different branch. In another embodiment, shadow file server 130b is configured as a back-up or replica to shadow file server 130a.

The network 195 facilitates data transfers between connected hosts (e.g., 110, 120, 130, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow filer servers 130, connected to a LAN.

Figure 2:
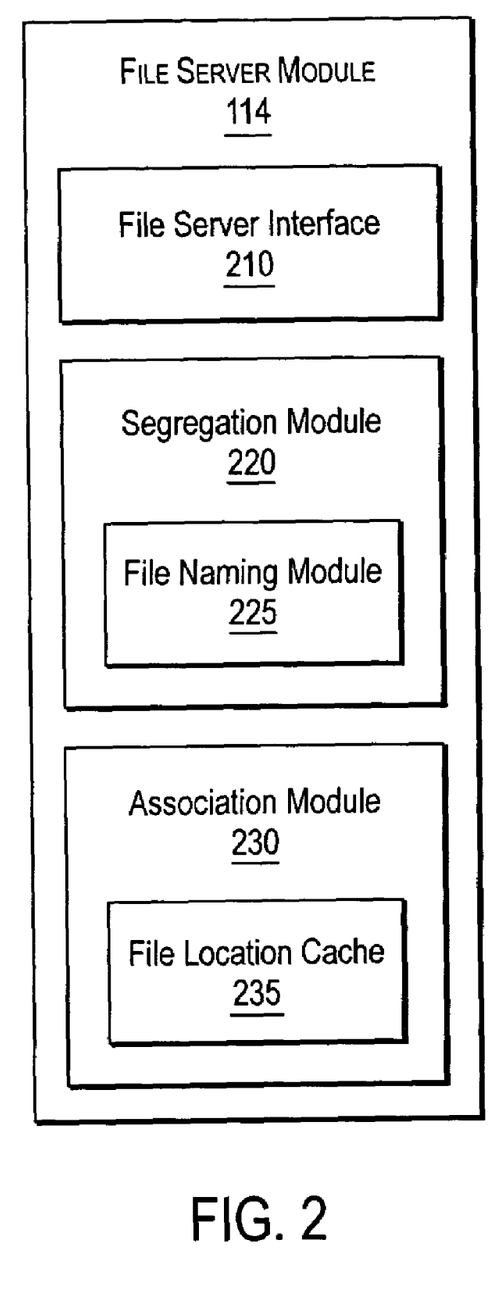
FIG. 2 is a block diagram illustrating a file server module according to one embodiment of the present invention.

FIG. 2 is a block diagram illustrating the file server module 114 according to one embodiment of the present invention. The file server module 114 comprises a file server interface 210, a segregation module 220, and an association module 230. Generally, the file server interface 210 manages client requests using the segregation module 220 for inputting separated objects to the storage network 175, and using the association module for outputting reconstructed objects to the client 140. Note that rather than being strict structural separations, "modules" are merely exemplary groupings of functionality corresponding to one or many structures.

The file server interface 210 receives a switch file handle with a request from the client 140 which it uses to form a NAS file handle with a request to the shadow server 130. If the request involves data input, the file server interface 210 receives file handles for both the holey file and shadow file from the segregation module 220. Data input includes, for example, create, move, modify requests for an object. However, if the request involves data output, the file server interface 210 receives file handles for both the holey file and shadow file from the association module 230.

The segregation module 220 receives an input request from the file server interface 210 from which it forms requests to the directory and shadow servers 120, 130. The segregation module 220 separates metadata and date associated with a common object. The segregation module 220 further comprises a file naming module 225 to generate a name, such as by using a hash function. For example, an MD-5 hash function inputs a raw shadow name derived from a name of the directory server 120, the name of the NAS protocol (e.g., NFS or CIFS), and/or a location of the directory server 120. The MD-5 hash function of the example outputs a 128-bit number. The segregation module 220 then generates a file handle based on a storage location in the shadow server 130. Additionally, the segregation module 220 generates a file handle based on a storage location of the metadata in the directory server 120. The association module 230 updates a directory server table stored in either the NAS switch 110 of the directory file server 120. The directory server table contains a list of directories and where associated shadow files are stored. The association module 230 may also update a file location cache 235.

The association module 230 receives an output request from the client 140 from the file server interface 210 from which it forms output requests to the directory and shadow servers 120, 130. In the preferred embodiment, the association module 230 further comprises the file location cache 235 for faster look-ups of explicit associations. Accordingly, the file location cache 235 stores file handles for holey and shadow files based on, for example, most recently accessed, most recently stored, most frequently stored, or other prediction models to improve performance. The association module 230 reconstructs objects from the separately stored metadata and data. The association module 230 first checks the file location cache 235 for explicit association. If none is returned, the association module 230 checks the directory server table. Additional embodiments of the file server module 112 and methods operating therein are described below.

Figure 3:
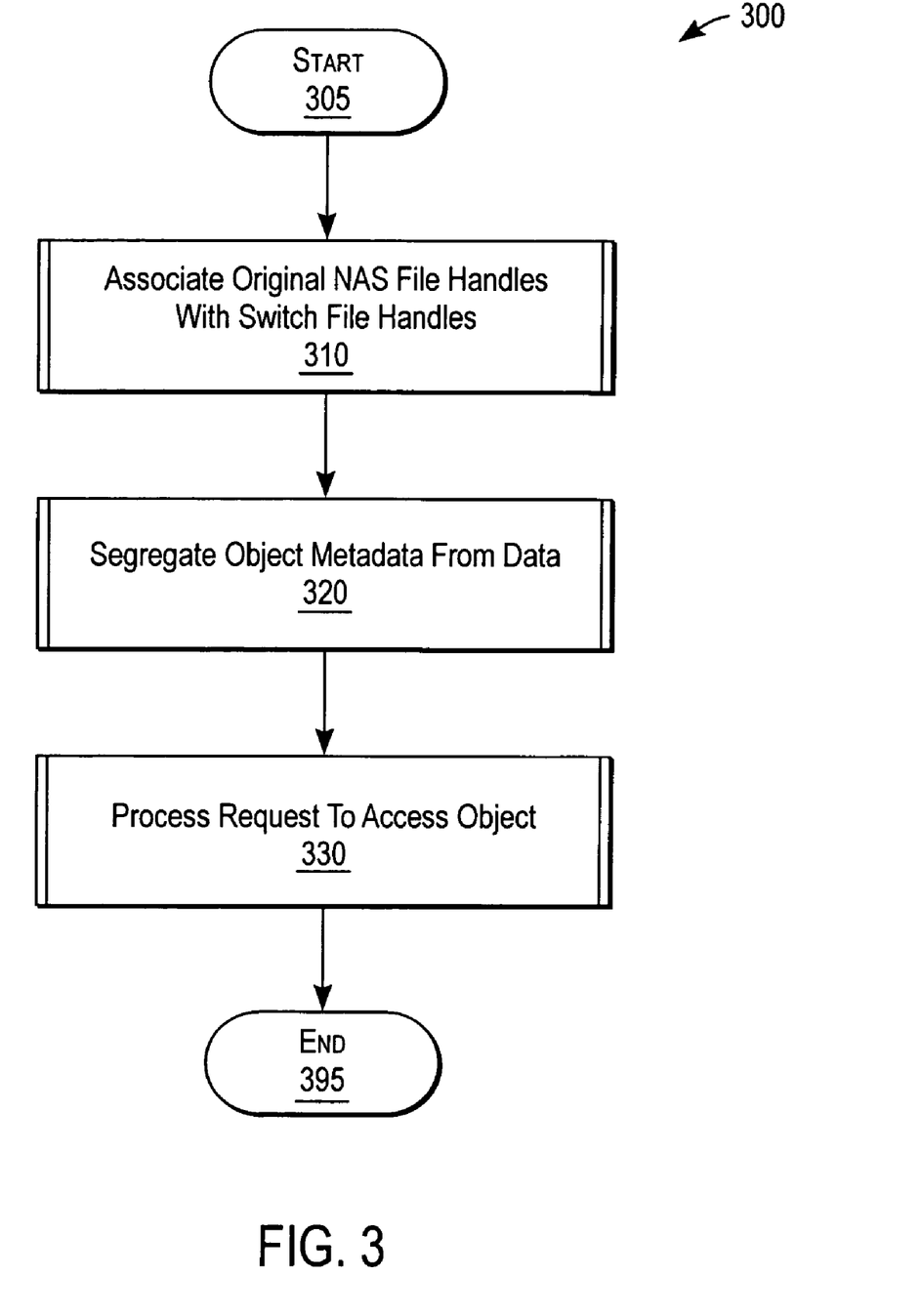
FIG. 3 is a high-level flow chart illustrating a method of extending a storage capacity of a directory file server according to one embodiment of the present invention.

FIG. 3 is a high-level flow chart illustrating a method 300 of extending the storage capacity of a directory file server 120 according to one embodiment of the present invention. The client module 114 associates 310 original NAS file handles with switch file handles as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

The segregation module 220 segregates 320 metadata from data as described below with respect to FIG. 5. Because metadata associated with a file is relatively small compared to actual data, the directory file server 120 can be configured such that it appears to the client 140 to be storing an amount of data that exceeds its actual storage capacity. The association module 230 processes 330 requests to access objects as described below with respect to FIG. 6. The reconstructed objects are sent directly from the storage network 175 or indirectly through the NAS switch 110 to the client 140.

In one embodiment, the segregation module 220 performs a tree hollowing process to segregate objects already existing on a prior art NAS file server. Thus, rather than segregating 320 responsive to client request for inputs, the segregation module 220 initiates requests. The segregation module 220 can also use error monitoring to compare a file's size before and after hollowing. If the file size and/or file data changes, then data may have been written or deleted in the interim. In response, the data transfer process is repeated until the file size and/or file data remain constant.

Figure 4:
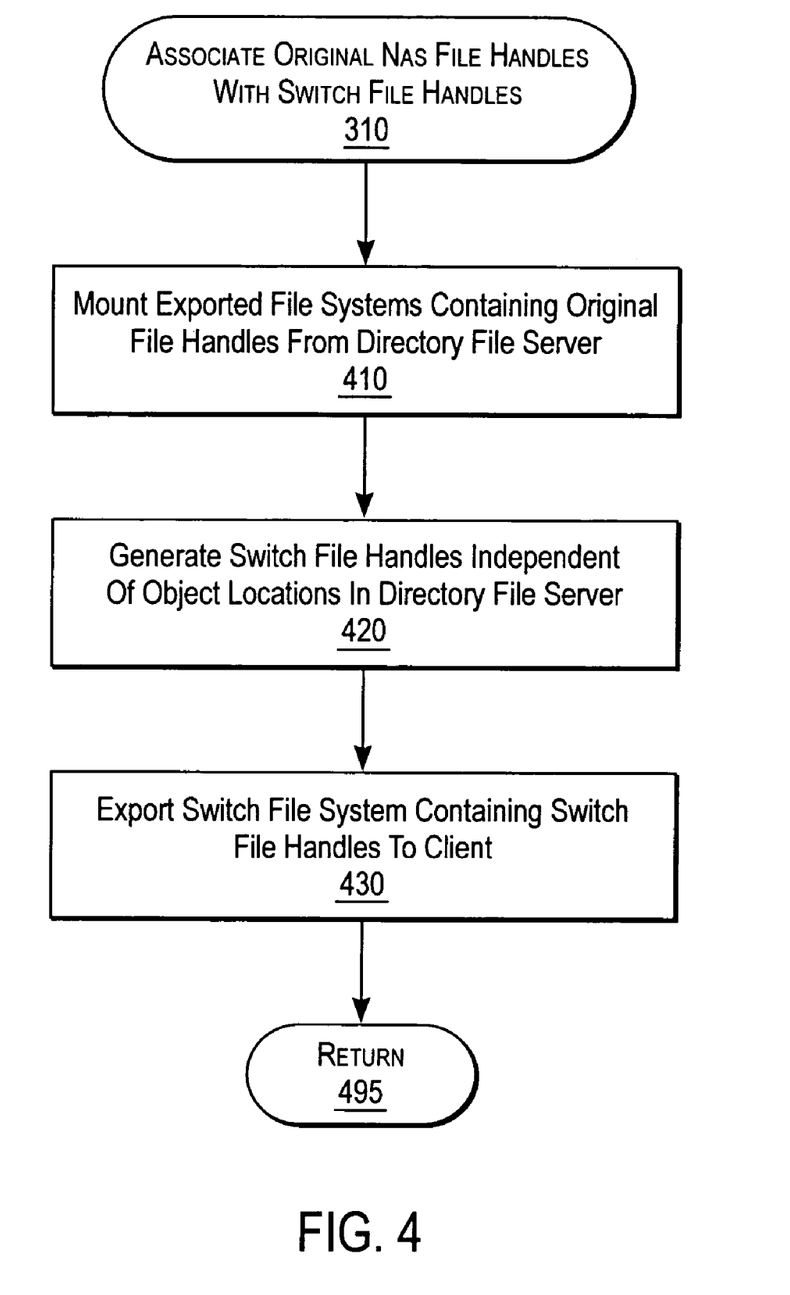
FIG. 4 is a flow chart illustrating a method of associating original NAS file handles with switch file handles according to one embodiment of the present invention.

FIG. 4 is a flow chart illustration the method of associating 310 original NAS file handles with switch file handles according to one embodiment of the present invention. Initially, the NAS switch 110 mounts 410 an exported directory of file systems from the directory file server 120. The exported file system organizes objects on the directory file server 120 into a hierarchy of original NAS file handles. In one embodiment, the NAS switch 110 receives exported directories from associated file servers 120 and, in turn, sends exported directories to associated clients 140.

The client module 112 generates 420 switch file handles independent of object locations in the primary file server 120. The client module 112 organizes exported file systems from the directory file server 120 by replacing file system or tree identifiers with a switch file system number as shown below in Tables 2A and 2B.

The client module 112 exports 430 the switch file system, containing the switch file handles, to the client 140 to use to look-up objects and request operations. In the reverse process, the NAS switch 110 receives the NAS request and looks-up the switch file handle to obtain an appropriate NAS file handle. Accordingly, the file server interface 210 checks entries of nested tables maintained by the association module 230. The file server interface 210 generates a NAS file handle from the switch file handle based on an object location. An example of the contents of an NFS and CIFS file handle are shown in Tables 1A and 1B, while an example of switch file handles or modified NFS and CIFS file handles are shown in Tables 2A and 2B:

TABLE 1A

NFS File Handle Contents

| Field Name | Description |
|---|---|
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
|---|---|
| tree id | Tree identification - assigned by a CIFS server |
| file id | File identification - unique within a tree identification |

TABLE 2A

Contents of NFS Switch File Handle

| Field Name | Description |
|---|---|
| file system id | File system identification - index to NAS switch 110 file system export table that identifies the name and location of a NAS file server |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
|---|---|
| file system id | File system identification - index to NAS switch 110 file system export table that identifies the name and location of a NAS file server |
| file id | File identification - unique within a tree identification |

In one embodiment, after objects have been migrated out of the directory file server 120 to a shadow file server 130, the client module 112 updates NAS file handles associated with a switch file handle. Thereby, the client 140 can access objects at new locations using the same switch file handle.

Figure 5:
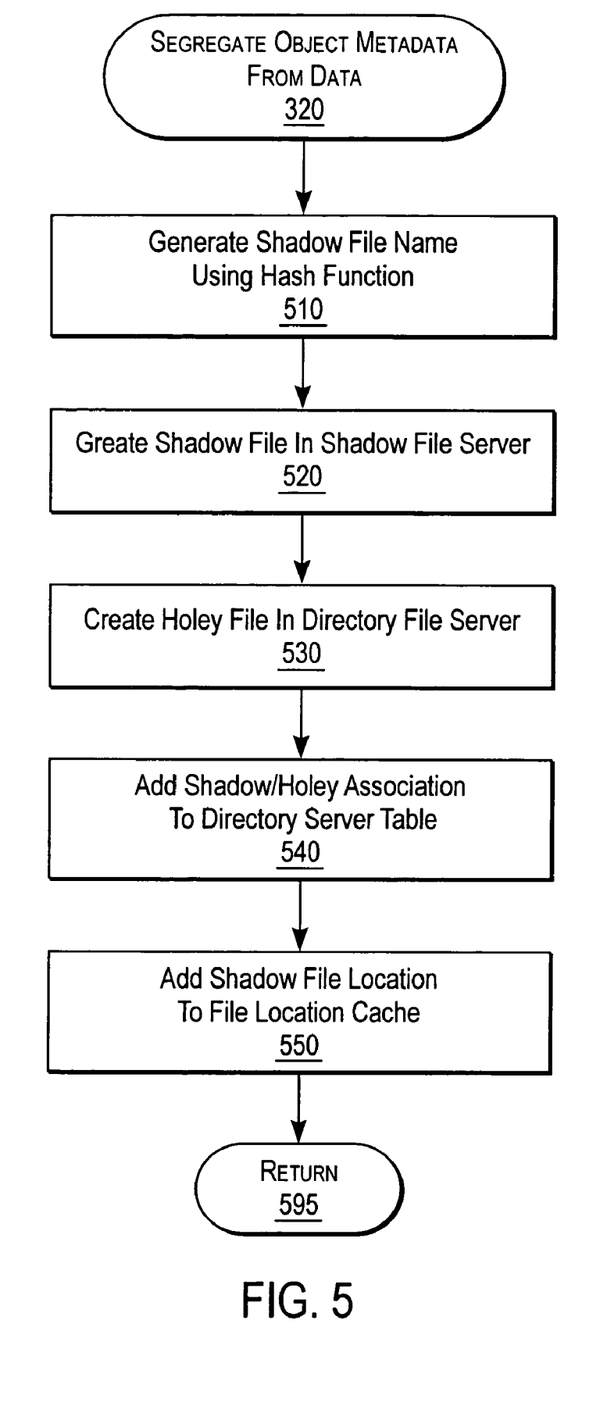
FIG. 5 is a flow chart illustrating a method of segregating metadata in a directory file server from data in a shadow file server according to one embodiment of the present invention.

FIG. 5 is a flow chart illustrating the method of segregating 320 metadata from data in the directory file server according to one embodiment of the present invention. The file naming module 225 generates 510 a shadow file name using a hash function. In one embodiment, the file naming module 225 obtains a raw shadow file name from a holey file. The raw shadow file name can be of the form S/P/Q where S is the name of the directory file server 120, P is the name of the NAS protocol, and Q is a stringified form of the file handle in NFS and is the pathname used to access the file on the directory file server 120 in CIFS. Using the raw shadow file name as an input, a one-way hash function such as MD5 then converts the raw shadow name to a 128-bit number. The MD5 hash function is described in RFC (Request for Comments) 1321 promulgated by the IETF (Internet Engineering Task Force). The file naming module 235 converts the 128-bit number into a hex string. The segregation module 220 uses the lower order N-bits of the 128-bit number as an index to directories on the shadow file server 130.

The segregation module 220 creates 520 a shadow file in the shadow file server 130 using the hex string as the shadow file name. To determine which shadow file server 130 should be used, the segregation module 220 looks up the directory in the directory server map. For the same file, the segregation module 220 creates 530 a holey file in the directory file server 120. The holey file comprises an offset comparable to the actual file size so that it appears to have the file's size attribute. The segregation module adds 220 a shadow/holey file association to the directory server table if necessary. The association module 230 also adds 550 a file location to the file location cache 235.

Figure 6:
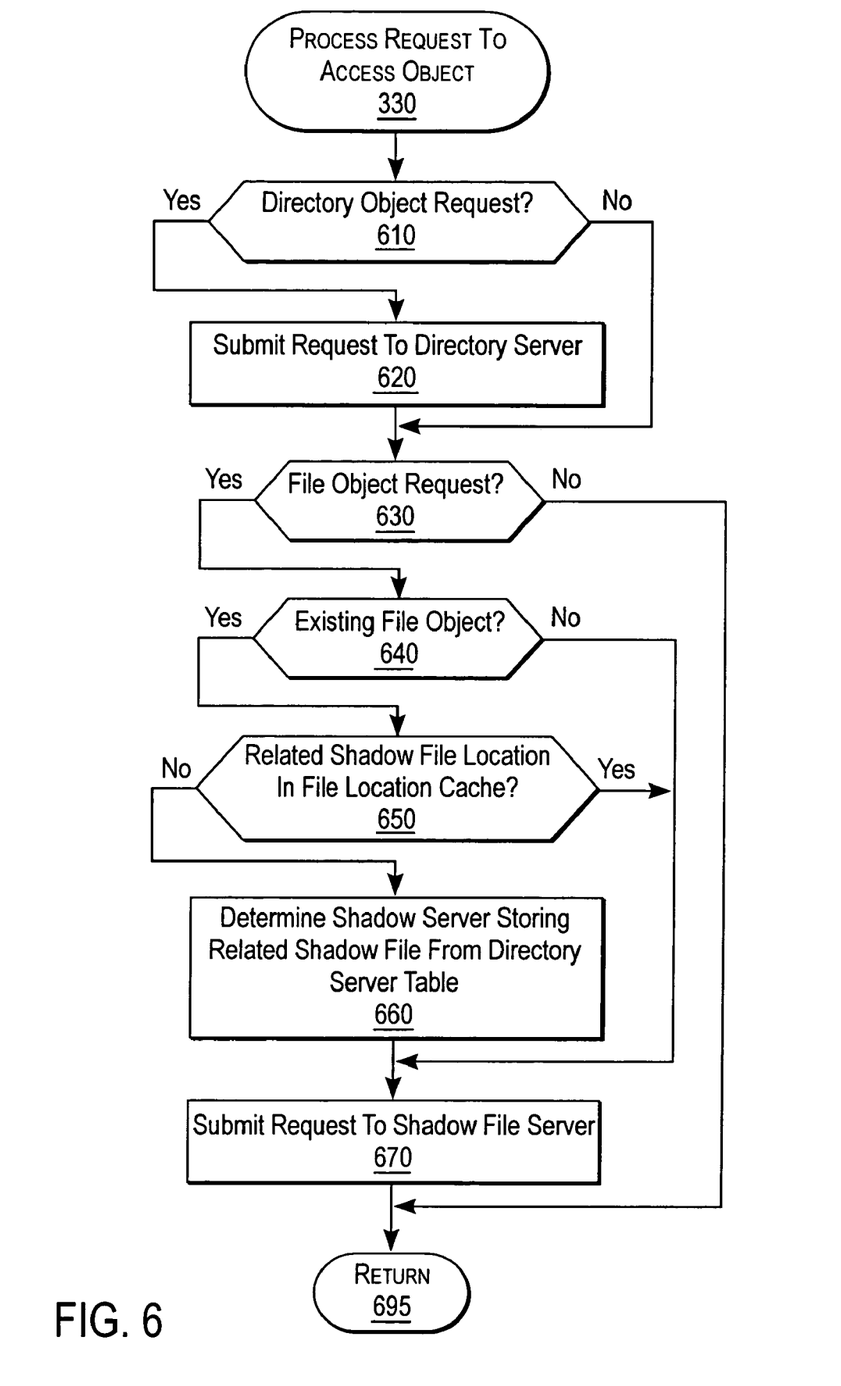
FIG. 6 is a flow chart illustrating a method of processing requests to access objects according to one embodiment of the present invention.

FIG. 6 is a flow chart illustrating the method of processing 330 requests to access objects according to one embodiment of the present invention. When the client 140 sends an operation request, the association module 230 determines whether it's a directory or file object request 610. Since directory requests comprise metadata, the file server interface 210 sends them to the directory file server 120 containing the directory. For a directory creation request, the segregation module 220 sends the request to the directory server 120. In one embodiment, the file server interface 210 performs file handle switching by converting the switch file handle received from the client 140 to the NAS file handle sent to the directory file server 120. Upon successful completion, the segregation module 220 selects the next available shadow file server 130, for example, on a round-robin basis. The segregation module 220 then adds the association between the directory and the selected shadow file server 130 to the directory server table. For a directory deletion request, the segregation module 220 deletes a corresponding association. Directory requests can also involve files such as file creations as described below.

The request may relate to a file object 630. For read/write requests of existing file objects 640, the association module 230 checks the file location cache 235 to locate the shadow file server 130 for the holey file 650. If there is a cache hit, the file server interface 210 forwards the request as indicated therein. In one embodiment, if there is a cache miss, the association module 230 determines the shadow server 130 from the directory server table and submits 670 the request to that location. In another embodiment where the shadow file servers 130 store directory server tables, the association module 230 sends the request to each shadow file server 130 to check their directory server tables. When one of the shadow file server 130 responds, the association module 230 can update the file location cache 235. Otherwise, there is an error.

Some requests are hybrid in that they require both directory requests and file requests. For a file creation request, the association module 230 forwards the request to the directory file server 120 to create a holey file. Upon successful completion, the association module 230 checks the file location cache 235 for the associated shadow file server 130. If there is a cache hit, the association module 230 forwards the creation request as indicated. If there is a cache miss, the association module 230 resorts the directory server map. For a remove file request, the association module 230 forwards the remove request to the directory file server 120 to remove the holey file. Upon successful completion, the association module 230 forwards the remove request as indicated by the file location cache 235 or the directory server table. For a truncate file size request, the association module 230 forwards the request to the directory file server 120 to change the holey file's size. Upon successful completion, the association module 230 forwards the truncation request as indicated by the file location cache 235 or the directory server table.

In one embodiment, the NAS switch 110 maintains several replica file servers that are synchronized with the shadow file servers 130. Thus, the NAS switch 110 can replicate request to each of the appropriate replica file servers to maintain synchronicity. The directory server maps in this case can contain more than one server association. The file location cache 235 can store a flag indicating that a file has several copies. In another embodiment, the NAS switch 110 coordinates data migration data from one shadow file server 130 to another. Accordingly, NAS switch 110 can update the directory server table. Also, a stored file handle pointing to the new location of the data can be placed in the former location.

The above description is included to illustrate the operation of the preferred embodiments and is not meant to limit the scope of the invention. The scope of the invention is instead be limited only by the following claims.

We claim:

1. A method for extending the storage capacity of a file server in a decentralized storage network, comprising:
   storing data for an object on a shadow file server;
   generating a range of consecutive data values commensurate with a first size of the object;
   compressing the range of consecutive data values to generate a holey file;
   storing the holey file as size metadata for the object on a directory file server; and
   adding an entry to a directory server table to associate the data and the size metadata for reconstruction of the object.

2. The method of claim 1, further comprising:
   modifying the stored data for the object to a second size; and
   changing the range of consecutive data values based on the second size.

3. The method of claim 1, further comprising:
   receiving the object from a client for storage on the storage network.

4. The method of claim 1, further comprising:
   converting an existing file server to the directory file server by moving data to the shadow file server and replacing files with holey files.

5. The method of claim 1, further comprising:
   naming a shadow file containing the data with a hash function.

6. The method of claim 1, wherein the directory server table associates one or more directories of the directory file server with the shadow file server.

7. The method of claim 1, further comprising:
   adding an entry to a file location cache to associate a switch file handle used by a client to access the object from a network attached storage switch with a shadow file handle used by the network attached storage switch to access a shadow file from the shadow file server.

8. The method of claim 7, further comprising:
   receiving a request to access the object with the switch file handle;
   looking-up the shadow file handle in the file location cache; and
   submitting the access request using the shadow file handle.

9. The method of claim 8, further comprising:
   removing entries from the file location cache responsive to surpassing a capacity;
   responsive to not finding the shadow file handle in the file location cache, looking-up a directory associated with the object in the directory server table to obtain the associated shadow file server; and
   submitting the request to the shadow file server.

10. The method of claim 1, further comprising:
    receiving a request to access the object that affects a directory; and
    submitting the request to the directory file server.

11. The method of claim 10, wherein the request comprises one from the group consisting of: create directory, delete directory, and move directory.

12. The method of claim 1, further comprising:
    receiving a request to access the object that affects a shadow file; and
    submitting the request to the shadow file server.

13. The method of claim 12, wherein the request comprises one from the group consisting of: create file, delete file, move file, copy file, read file, and write file.

14. The method of claim 1, further comprising:
    receiving a request to access the object that affects a directory and a shadow file; and
    submitting the request to the directory file server and the shadow file server.

15. The method of claim 14, wherein the request comprises one from the group consisting of: create file, delete file, move file, copy file, and truncate file.

16. The method of claim 1, further comprising:
    providing a file service to a shadow file location on the shadow file server from the directory file server.

17. The method of claim 16, wherein the file service comprises file locking to preserve data integrity of the shadow file during multiple accesses.

18. The method of claim 1, wherein the object comprises a directory hierarchy having objects representative of sub-directories and files.

19. The method of claim 1, wherein the object comprises a file.

20. The method of claim 1, further comprising:
    mapping a switch file handle that is independent of a location of the object to a first network attached storage file handle that is indicative of a first location of the metadata.

21. The method of claim 20, further comprising:
    storing the data at a second location; and
    mapping the switch file handle to a second network attached storage file handle that is indicative of the second location.

22. A network attached storage (NAS) switch to extend the storage capacity of a file server in a NAS storage network, comprising:
    a segregation module to segregate an object by storing data for the object on a shadow file server, and storing size metadata for the object on a directory file server as size metadata in the form of a holey file generated from compressing a range of consecutive data values commensurate with a first size of the object, the segregation module associating the data and the size metadata in a directory server table; and
    an association module to retrieve the object from the data and the metadata in the directory server table.

23. The NAS switch of claim 22, wherein the segregation module modifies the stored data for the object to a second size and changes the offset of data values based on the second size.

24. The NAS switch of claim 22, further comprising:
a client module to receive the object from a client for storage on the storage network.

25. The NAS switch of claim 22, wherein the segregation module converts an existing file server to the directory file server by moving data to the shadow file server and replacing files with holey files.

26. The NAS switch of claim 22, further comprising:
a file naming module to name a shadow file containing the data with a hash function.

27. The NAS switch of claim 22, wherein the directory server table associates one or more directories of the directory file server with the shadow file server.

28. The NAS switch of claim 22, further comprising:
a file location cache,
wherein the segregation module adds an entry to the file location cache, the entry comprising a switch file handle used by a client to access the object from a NAS switch in association with a shadow file handle from the shadow file server.

29. The NAS switch of claim 28, further comprising:
a client module to receive a request to access the object with the switch file handle; and
a file server interface to submit the request to the shadow file server,
wherein the association module looks-up the shadow file handle in the file location cache.

30. The NAS switch of claim 29, wherein the file location cache removes entries responsive to surpassing a capacity, and the association module looks-up the object in the directory server table to obtain the associated shadow file server responsive to not finding the shadow file handle in the file location cache, and the file server interface submits the request to the shadow file server.

31. The NAS switch of claim 22, wherein the segregation module receives a request to access the object that affects a directory, and a file server interface submits the request to the directory file server.

32. The NAS switch of claim 31, wherein the request comprises one from the group consisting of: create directory, delete directory, and move directory.

33. The NAS switch of claim 22, wherein the segregation module, responsive to receiving a request to access the object that affects a shadow file, submits the request to the shadow file server.

34. The NAS switch of claim 33, wherein the request comprises one from the group consisting of: create file, delete file, move file, copy file, read file, and write file.

35. The NAS switch of claim 22, wherein the segregation module, responsive to receiving a request to access the object that affects a directory and a shadow file, submits the request to the directory file server and the shadow file server.

36. The NAS switch of claim 35, wherein the request comprises one from the group consisting of: create file, delete file, move file, copy file, and truncate file.

37. The NAS switch of claim 22, wherein the directory file server provides a file service to a shadow file located on the shadow file server.

38. The NAS switch of claim 37, wherein the file service comprises file locking to preserve data integrity of the shadow file during multiple accesses.

39. The NAS switch of claim 22, wherein the object comprises a directory hierarchy having objects representative of sub-directories and files.

40. The NAS switch of claim 22, wherein the object comprises a file.

41. A computer program product, comprising a computer-readable medium having computer program instructions for a method of extending the storage capacity of a file server in a decentralized storage network, the method comprising the steps of:
storing data for an object on a shadow file server;
generating a range of consecutive data values commensurate with a first size of the object;
compressing the range of consecutive data values to generate a holey file;
storing the holey file as size metadata for the object on a directory file server; and
adding an entry to a directory server table to associate the data and the size metadata for reconstruction of the object.

42. A network attached storage (NAS) switch to access an object in a storage network, comprising:
a means for segregating data of an object, for storage on a shadow file server, from metadata of the object, for storage on a directory file server as size metadata in the form of a holey file generated from compressing a range of consecutive data values commensurate with a first size of the object; and
a means for associating the data and the metadata in a directory server table.

43. A method for extending the storage capacity of a file server in a decentralized storage network, comprising:
receiving an object in a switch device;
storing file data for the object on a shadow file server;
generating size metadata for the object with a holey file, the holey file representative of a range of consecutive data values that is commensurate with a first size of the object; and
storing the holey file in a file system on a directory file server, the directory file server configured to provide a directory of files with file sizes.

44. The method of claim 43, further comprising:
receiving a request in the switch device;
if the request comprises a request for access to the directory, forwarding the directory file server; and
if the request comprises a request for access to the object, forwarding the request to the shadow file server.

* * * * *

UNITED STATES PATENT AND TRADEMARK OFFICE
CERTIFICATE OF CORRECTION

PATENT NO. : 7,072,917 B2  Page 1 of 1
APPLICATION NO. : 10/832927
DATED : July 4, 2006
INVENTOR(S) : Thomas K. Wong et al.

It is certified that error appears in the above-identified patent and that said Letters Patent is hereby corrected as shown below:

Column 12,

Line 34, please replace "location" with "located" after "file"

Signed and Sealed this

Seventeenth Day of October, 2006

JON W. DUDAS
*Director of the United States Patent and Trademark Office*